May 5, 1970  H. R. SHAFFER  3,510,704
AUTOMATIC ELECTRIC BRAKE FOR ELECTRIC MOTOR
Filed Dec. 8, 1967  3 Sheets-Sheet 2
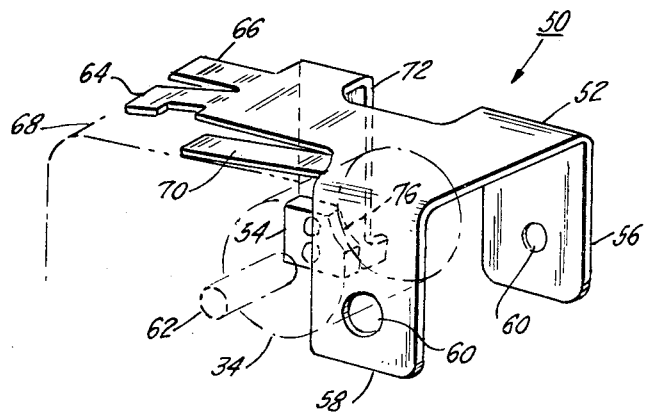
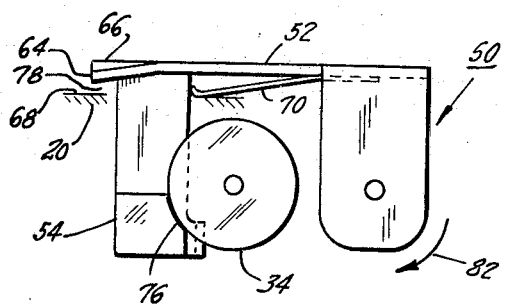
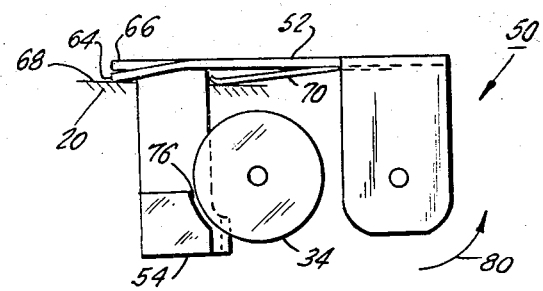
INVENTOR.
HOWARD R. SHAFFER
BY
OSTROLENK, FABER, GERB & SOFFEN
ATTORNEYS

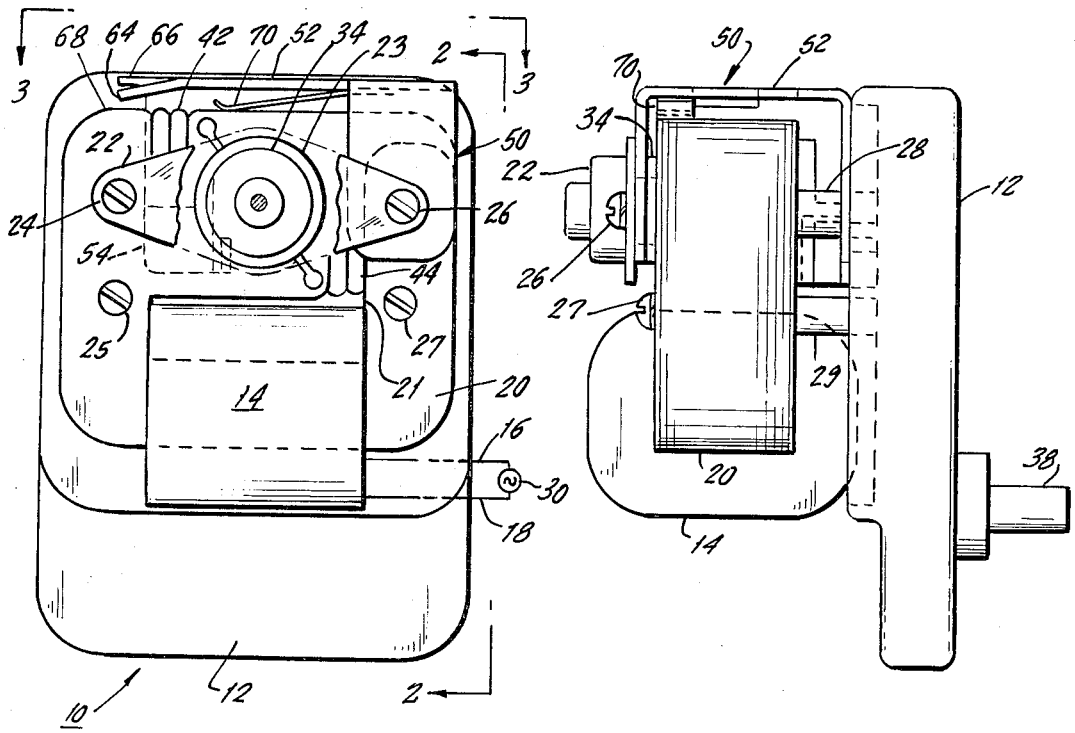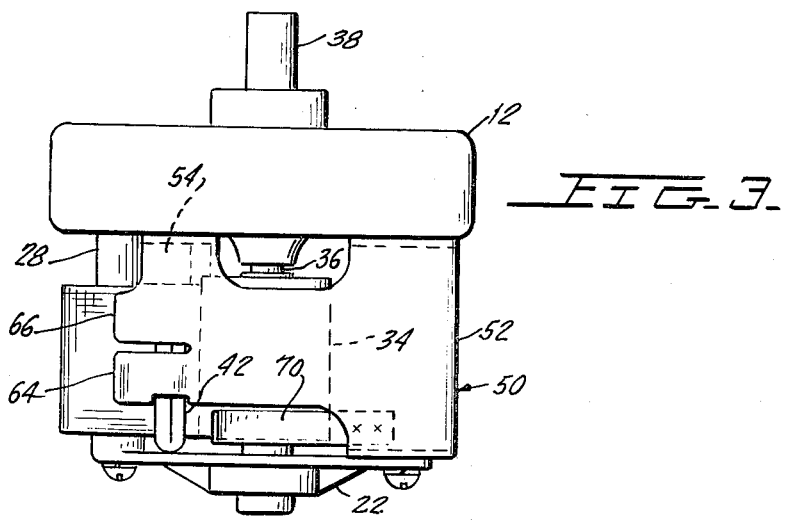

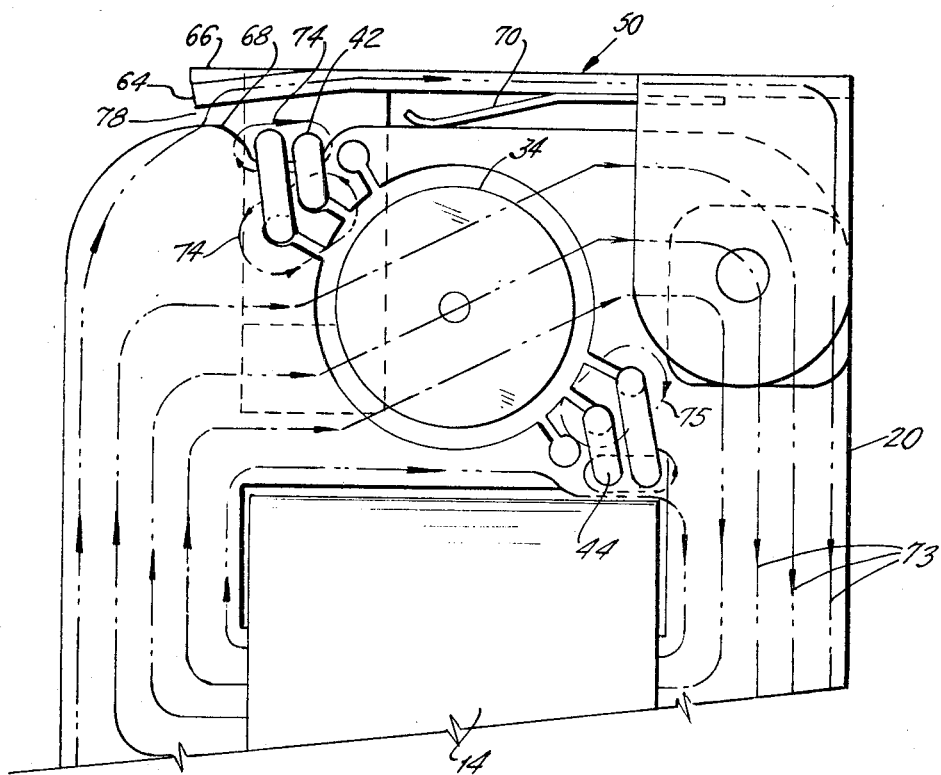

United States Patent Office 3,510,704
Patented May 5, 1970

3,510,704
AUTOMATIC ELECTRIC BRAKE FOR ELECTRIC MOTOR
Howard R. Shaffer, Glenside, Pa., assignor, by mesne assignments, to I-T-E Imperial Corporation, Philadelphia, Pa., a corporation of Delaware
Filed Dec. 8, 1967, Ser. No. 689,041
Int. Cl. H02k 11/00
U.S. Cl. 310—77                              2 Claims

ABSTRACT OF THE DISCLOSURE

An electric motor having a rotating armature and having a shading coil associated with the main motor coil, which shading coil redirects leakage magnetic flux of the motor into its own vicinity; a motor brake including a pivotable support having a magnetizable portion, which portion is located in the vicinity of the shading coil and is attracted to the shading coil when flux is concentrated in its vicinity, thereby pivoting the brake support; a brake shoe on the brake support, which shoe is pivoted into engagement with the motor armature to halt rotation of same; the brake shoe being so positioned on the support as to pivot away from the armature when the magnetizable portion is attracted to the shading coil; and a biasing means for normally biasing the brake shoe into engagement with the armature when there is no flux in the vicinity of the shading coils.

---

This invention relates to a magnetically actuated brake for an electric motor.

An electric motor includes a coil connected to a source of alternating current. When current flows through the coil, alternating magnetic flux is induced in it. The motor also comprises a rotatable rotor or armature. The alternating magnetic flux, in a manner well known in the art, causes the armature to rotate.

The armature and the other components thereto connected usually have sufficient weight so that when the current to the coil is cut off, the momentum of the armature and the other components is sufficient to keep the armature rotating. In many installations, however, damage may occur to equipment being operated by the rotating armature if the armature continues to rotate after the power to the motor is cut off. For example, in U.S. Pat. No. 2,845,509, issued to John C. Brumfield on July 29, 1958, entitled "Motor Operated Circuit Breaker" and assigned to the assignee hereof, a motor is used to drive an intermediate mechanism that operates the operating handle of a circuit breaker. Once the handle has been moved to a predetermined position, the armature of the motor must cease operating or else the motor will move the circuit breaker handle to a different position or to an intermediate position, neither of which results are desired. It is desirable, therefore, to provide a brake for the armature of the motor to halt its rotation once the power to the coil has been cut off. For instance, a motor for a circuit breaker might be adapted with a brake in accordance with this invention to prevent the circuit breaker handle from being moved to an undesired position. It is to be understood that the brake of the present invention is not limited in its use to the specific circuit breaker appearing in the above noted patent or to circuit breakers in general, but may be used in any application for which it is suited.

It is desirable to use a brake requiring a minimum of components and to design a brake which does not require a separate brake operating mechanism to be added to the motor.

The magnetically operated brake of the present invention is used on a motor having a rotatable armature and a coil in which an alternating magnetic flux is induced by alternating current flowing therethrough. The coil has a core passing therethrough which surrounds the armature to concentrate the magnetic flux in the vicinity of the armature for optimum utilization of the power being fed to the coil. Both the coil and the core exert magnetically attractive force due to the flux in them and will be together referred to as the coil means.

The brake of the present invention comprises a brake shoe and a support therefor. At least a portion of the support is comprised of magnetizable material and is positioned so as to be attracted toward the coil means when the latter is energized. The brake shoe is connected with the support and is normally biased ino engagement with the armature for halting the rotation thereof. The brake shoe is so positioned with respect to the magnetically attractable portion of the support that when the said portion of the support is attracted toward the coil means, the brake shoe moves away from the armature, permitting the armature to rotate freely. Therefore, when the motor is energized and operating, the magnetizable portion of the support means moves toward the coil means and the brake shoe moves away from the armature.

As soon as the motor is deenergized, the attraction of the coil means for the magnetizable portion of the support means ceases. The biasing means immediately biases the brake shoe into engagement with the armature, and at the same time moves the magnetizable portion of the support away from the coil means.

Accordingly, it is the primary object of the present invention to provide a magnetically operated motor brake which is responsive to the magnetic flux in the coil of an electric motor.

It is another object of the present invention to provide such a brake which may be added to a motor by the addition of a minimum of additional components.

It is another object of the present invention to provide such a brake which is caused to operate automatically in response to actuation and deactuation of the motor.

These and other objects of the present invention will become apparent when the following description is read in conjunction with the accompanying drawings in which:

FIG. 1 is a view in elevation of a motor adapted with the brake of the present invention;

FIG. 2 is a view in the direction of 2—2 of FIG. 1;

FIG. 3 is a plan view in the direction 3—3 of FIG. 1;

FIG. 4 is a perspective of the brake of the present invention, showing its position with respect to the armature of the motor;

FIG. 5 is a diagrammatic view of the brake of the present invention when the motor in conjunction with which it is used is deenergized;

FIG. 6 is a diagrammatic view of the brake of the present invention when the motor in conjunction with which it is used is energized; and FIG. 7 is a schematic cross-sectional view of the motor of the present invention illustrating the principle of its operation.

Referring to the figures, and especially to FIGS. 1–3 and 7, a motor 10 is there shown having a mounting element or support plate 12. A coil of wire 14 is provided having electric leads 16 and 18 connected to the opposite ends thereof in a manner well known in the art. The coil passes through an opening 21 in core 20 and is wrapped around the exterior of the core. The core is formed of a material which conducts and concentrates magnetic flux. It may be comprised of a plurality of thin rectangular steel plates laminated together. The core also has an aperture 23 therethrough in which is positioned the armature 34 of the motor to be described.

A protective cover and bearing 22 is fastened by screws 24 and 26 over the core and over the end of the armature. The screws 24 and 26 pass through posts 28 and the screws 25 and 27 pass through posts 29, into support plate 12, whereby they attach the core 20 to the support 12.

When a source 30 of alternating current is connected between leads 16 and 18, this induces alternating magnetic flux in coil 14.

The core 20 surrounds the hereinafter described armature 34 and concentrates the magnetic flux around the armature. The core, therefore, aids the coil 14; and the coil 14 and core 20 will together be referred to as the coil means.

The armature 34 of the motor is a standard magnetic armature with shorted copper bars throughout, well known in the art, and commonly called "squirrel cage" construction. Alternatively, armature 34 might be a wound wire constructed armature, or other form of armature known in the art. It is caused to rotate when alternating current is connected between leads 16 and 18. The armature is connected with a shaft 36 (FIG. 3) which extends into the motor support 12. Encased within the motor support 12 is a plurality of gears (not shown) which transmit the rotation of the armature to the output shaft 38 of the motor.

Referring to FIGS. 1 and 7, the core 20 has shading coils 42 and 44 wrapped thereabout and passing therethrough to redirect the magnetic flux through the core 20, viz. to rotate the magnetic flux around the coils 42, 44, and to concentrate magnetic flux in the vicinity of the later described magnetically attractable portion 64, 66 of the brake support means 52.

Referring to FIGS. 1-4, brake means 50 comprises a support means 52 and a brake shoe 54 thereto secured. The support means 52 has legs 56 and 58 having apertures 60 therethrough. Screw 26 and the post 28 thereabout pass through the apertures 60. The legs 56, 58 fit loosely around the screw and the post, whereby the brake is enabled to freely pivot in a manner to be described.

The armature 34 has a central shaft and axis 62, as can be seen in FIG. 4. The screw 26 and post 28 provide an axis of pivot for the brake support 52. This axis must be so disposed that brake shoe 54 can be moved into and out of engagement with armature 34 by pivoting of brake support 52. For example the axis of brake support 52 may be parallel to the axis 62 of the armature 34.

The brake support means 52 may be integrally formed of a single sheet of magnetizable material, such as steel. However, only one portion thereof which may be referred to as an armature portion, need be comprised of a material that is attracted to magnetic flux. In the drawings, that portion is comprised of tabs 64 and 66. When the coil is energized and magnetic flux passes through core 20, the magnetic flux in the core draws tabs 64, 66 toward surface 68 of the core. The brake support means 52 pivots counterclockwise, as viewed in FIG. 1 until the downwardly inclined tab 64 contacts the surface 68 of the core. Tab 64 may be more or less downwardly inclined. In this way, the brake may be calibrated to vary the amount support 52 will pivot before contacting the surface of core 68, thereby adjusting the initial operating point of the brake for deviations in motor and brake construction parameters.

A biasing means, such as leaf spring 70, or any other biasing means, e.g. a spirally wound spring, which would perform the desired function, is connected with the brake shoe 54 in a manner which biases the brake shoe 54 toward the surface of armature 34.

As shown in FIG. 1 and 4, the leaf spring 70, is attached to brake support 52 and presses against the upper surface 68 of the core to bias the tabs 64, 66 upward. This pivots the brake support 52 clockwise as viewed in FIG. 1.

The brake shoe 54 is connected by arm 72 to the brake support means 52. The brake shoe is normally in engagement with the armature for restraining movement of the latter and is positioned so that the surface 68 of the core and the armature 34 are between the brake shoe 54 and the magnetically attractable tabs 64, 66 of the brake. Therefore, when the tabs 64, 66 are attracted to the core 20, the brake shoe is simultaneously moved away from the armature 34. Similarly, when the power supply 30 to the coil 14 is cut off, the biasing means 70 biases the tabs 64, 66 away from the surface 68 of the core, and at the same time biases the brake shoe 54 into braking engagement with the armature 34.

The brake shoe 54 has a braking surface 76 which is adapted to engage a cooperating surface on the exterior of the armature 34. The surface 76 may be comprised of almost any material so long as it is capable of exerting a movement restraining force on the material of the cooperating surface on the exterior of the armature. Surface 76 preferably frictionally engages the surface on the armature, although other restraining means, such as a magnetic restraining device, may be used.

The operation of the brake of the present invention will now be described. Referring to FIG. 7, when the coil 14 is energized, it induces magnetic flux in core 20. The magnetic flux lines 73 are the lines of flux produced in the core by the main coil 14. The shading rings 42, 44 provide magnetic field rotation for the armature. The lines of flux 74 and 75 are, respectively, the lines of flux produced by the shading coils 42, 44.

As the coil 14 is energized at the proper voltage and alternating frequency, either the flux lines 73 from coil 14 or the flux lines 74 caused by shading coils 42 are present in the vicinity of the air gap 78 which is between the surface 68 of the core and the tab portions 64, 66 of the brake 50.

Referring now to FIGS. 5, 6 and 7, the brake support means 52 is normally in the position illustrated in FIGS. 5 and 7, in which the coil is deenergized, there is an air gap between tabs 64, 66 and core surface 68, and the bearing surface 76 of the brake shoe 54 is in frictional engagement with the cooperating surface on the exterior of the armature 34. The biasing means 70 ensures that tabs 64 and 66 are held away from core surface 68 and that bearing surfaces 76 on the brake shoe 54 is in secure frictional engagement with the exterior of armature 34.

When the coil 14 is energized by power source 30, the magnetic flux in core 20 exerts an attractive force on the magnetically attractable tabs 64 and 66, and causes brake support means 52 to pivot counterclockwise in the direction indicated by arrow 80 in FIG. 6 until tab 64 is in engagement with surface 68 of the core. The magnetic attraction exerted by core 20 is sufficient to overcome the biasing force of biasing means 70. The bearing surface 76 of brake shoe 54 is moved away from the cooperating surface on the exterior of armature 34, whereby the armature is enabled to be rotated by the alternating flux in the core, in a manner well known in the art.

Referring to FIG. 5, when the power to coil 14 is cut off, the magnetic flux in core 20 terminates and the magnetic attraction by core 20 on tabs 64 and 66 ceases. Biasing means 70 now pivots brake support means 52 clockwise, in the direction of arrow 82, until the bearing surface 76 of brake shoe 54 is brought into engagement with the cooperating surface on the exterior of armature 34. If armature 34 is continuing to rotate after power to coil 14 is turned off due to the momentum of the armature, when the bearing surface 76 moves into engagement with the armature 34, the frictional drag on the armature halts its rotation, whereby the brake shoe 54 operates as a brake on the armature 34.

There has just been described a novel brake for an electric motor, wherein the brake is formed from a minimum number of components and relies upon the inherent magnetic properties of the motor itself to operate the brake, rather than requiring additional mechanical components to be added to the motor in order to operate the brake.

Although this invention has been described with respect to its preferred embodiments, it should be understood that many variations and modifications will now be obvious to those skilled in the art, and it is preferred, therefore, that the scope of the invention be limited not by the specific disclosures herein, but only by the appended claims.

The embodiment of the invention in which an exclusive privilege or property is claimed are defined as follows:

1. In an electric motor comprising,
   an armature and an axis about which said armature rotates; a main motor coil adapted to have magnetic flux induced therein by electric current for causing rotation of said armature;
   a shading coil associated with said main coil for redirecting and concentrating in its vicinity stray magnetic flux;
   the improvement comprising, a motor brake including,
   a brake shoe adapted to engage said armature for halting rotation thereof,
   a support for said shoe; said brake shoe support including a portion located in the vicinity of said shading coil, which portion is comprised of magnetizable material that is attracted to and is moved toward said shading coil when flux is concentrated in its vicinity;
   said brake shoe being so positioned on said support and said support being designed so that said shoe moves to a position away from said armature when said shading coil is operating to concentrate flux in its vicinity;
   a biasing means connected with said brake shoe support for biasing said support so that said shoe moves into engagement with said armature when no flux is being concentrated by said shading coil.

2. In the electric motor of claim 1, the improvement further comprising,
   said brake means having a pivot axis for said brake support; said brake support pivoting around said pivot axis; said pivot axis extending in a direction which permits said brake support to pivot said brake shoe into and out of engagement with said armature.

References Cited

UNITED STATES PATENTS

| 3,032,667 | 5/1962 | Sorchy | 310—77 |
| 3,344,292 | 9/1957 | Hurst | 310—261 |
| 3,379,907 | 4/1968 | Hollinger | 310—77 |

FOREIGN PATENTS

| 1,090,633 | 4/1955 | France. |
| 1,191,099 | 10/1959 | France. |

J D MILLER Primary Examiner

R. SKUDY, Assistant Examiner

U.S. Cl. X.R.

310—121, 172